US008353625B1

(12) United States Patent
Feiter et al.

(10) Patent No.: US 8,353,625 B1
(45) Date of Patent: Jan. 15, 2013

(54) HEAT DETECTOR TESTER

(75) Inventors: Margaret A. Feiter, Schaumburg, IL (US); Scott J. Rote, New Lenox, IL (US); Aaron B. Eiger, Chicago, IL (US); Dan Casey Johnson, Chicago, IL (US)

(73) Assignee: HSI Fire & Safety Group, LLC, Elk Grove Village, IL (US)

( * ) Notice: Subject to any disclaimer, the term of this patent is extended or adjusted under 35 U.S.C. 154(b) by 0 days.

(21) Appl. No.: 13/251,919

(22) Filed: Oct. 3, 2011

(51) Int. Cl.
*G01J 5/00* (2006.01)

(52) U.S. Cl. ........................................ 374/121

(58) Field of Classification Search .................. 374/121
See application file for complete search history.

(56) References Cited

U.S. PATENT DOCUMENTS

| | | | | |
|---|---|---|---|---|
| 2,854,844 | A * | 10/1958 | Howell | 374/1 |
| 3,067,604 | A * | 12/1962 | Brunson | 374/1 |
| 3,802,249 | A * | 4/1974 | Clawson | 374/2 |
| 5,170,148 | A * | 12/1992 | Duggan et al. | 340/515 |
| 5,523,744 | A * | 6/1996 | Wieser | 340/630 |
| 5,611,620 | A * | 3/1997 | Wantz | 374/1 |
| 5,670,946 | A * | 9/1997 | Ellwood et al. | 340/628 |
| 6,015,230 | A * | 1/2000 | Wantz et al. | 374/1 |
| 6,121,883 | A * | 9/2000 | Hatsir | 340/584 |
| 6,423,962 | B1 * | 7/2002 | Pepper | 250/222.1 |
| 6,640,608 | B2 * | 11/2003 | Pepper et al. | 73/1.02 |
| 7,587,926 | B2 * | 9/2009 | Ackerman | 73/1.02 |
| 7,934,411 | B2 * | 5/2011 | Koch | 73/1.03 |
| 2008/0224847 | A1 * | 9/2008 | Pepper | 340/514 |
| 2009/0078065 | A1 * | 3/2009 | Rossiter | 73/865.6 |
| 2009/0273464 | A1 * | 11/2009 | Pepper et al. | 340/515 |
| 2009/0308134 | A1 * | 12/2009 | Pepper | 73/1.06 |
| 2010/0226408 | A1 * | 9/2010 | Skinner | 374/1 |
| 2010/0259376 | A1 * | 10/2010 | Hong | 340/515 |

FOREIGN PATENT DOCUMENTS

| | | | |
|---|---|---|---|
| GB | 2409319 | A * | 6/2005 |
| JP | 2006024064 | A * | 1/2006 |

* cited by examiner

*Primary Examiner* — Lisa Caputo
*Assistant Examiner* — Jamel Williams
(74) *Attorney, Agent, or Firm* — McCracken & Frank LLC

(57) ABSTRACT

This invention relates to a device for testing a heat detector. The device has a housing that is shaped to surround a heat detector and includes a heating element. A fan is located near the heating element and is adapted to activate the heat detector by increasing the temperature around the heat detector. The housing also includes a temperature device that measures the temperature near the heat detector. Furthermore, a display is attached to the housing to show the temperature around the heat detector during testing.

28 Claims, 3 Drawing Sheets

HEAT DETECTOR TESTER

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates to a device for testing a heat detector. More specifically, the present invention relates to a device for testing heat detectors that are located at various locations including those within a user's reach and those high above the floor, such that they cannot be easily reached.

2. Description of the Background of the Invention

Various types of heat detectors exist on the market including those that measure a fixed temperature and those that measure the rate of temperature rise. Fixed temperature heat detectors are designed to activate a visual and/or audible alarm after a fixed temperature is reached during a slow heat rise. Rate of rise heat detectors, on the other hand, sense rapid changes in the temperature in the surrounding air and when a certain change threshold is met will activate an alarm. Although fixed temperature and rate of temperature rise heat detectors can be installed as separate devices, they are also available in a single device. In addition, heat detectors come in myriad sizes and shapes. Some heat detectors exhibit a more traditional semi-circular shape and, when mounted, hang close to the ceiling or wall, while other heat detectors are more rectangular in shape and hang down from the ceiling when mounted.

Each type and style of heat detector has a range of effectiveness associated with it; therefore, large buildings such as warehouses and factories require multiple heat detectors. To ensure the safety of workers, goods, and equipment, heat detectors need to be tested regularly, efficiently, and accurately. A device for testing a heat detector should therefore be lightweight, durable, adaptable, reliable, easy to use, and provide necessary information to its operator or user.

The present invention seeks to improve upon the prior art through the use of an improved design for a device for testing heat detectors that enables efficient testing by providing a portable, lightweight device that can be used to test heat detectors of varying shapes, sizes, and locations and by providing a read out that can be recorded to check that the heat detector that is being tested has functioned properly.

SUMMARY OF THE INVENTION

In one aspect of the invention, a device for testing a heat detector is disclosed. The device comprises a housing shaped to receive a heat detector. A heating element is carried by the housing, and a fan is located proximate to the heater and adapted to activate the heat detector by increasing a temperature around the heat detector. The device also comprises a temperature device that is carried by the housing that measures the temperature near the heat detector. Furthermore, a display is attached to the housing that shows a value that relates to the temperature.

In another aspect of the invention, a device for testing a heat detector is disclosed. The device comprises a housing shaped to receive a heat detector. A heating element is carried by the housing and adapted to activate the heat detector by increasing a temperature around the heat detector. A temperature device is also carried by the housing that measures the temperature near the heat detector. Additionally, a memory is carried by the housing for storing a value related to the temperature. The device further comprises a test switch carried by the housing, wherein a change of state of the test switch causes the value to be stored in the memory.

In a further aspect of the invention, a method of testing a heat detector using a device is disclosed. The device comprises a housing shaped to receive a heat detector, a heating element carried by the housing and adapted to activate the heat detector by increasing a temperature around the heat detector, a temperature device carried by the housing that measures the temperature near the heat detector, a display attached to the housing that shows a value that relates to the temperature, a start switch carried by the housing, and a test switch carried by the housing, wherein a change of state of the test switch freezes the value shown on the display. The method comprises the step of moving the device toward the heat detector to be tested until a testing position is reached, wherein the housing of the device substantially surrounds the heat detector in the testing position and wherein the heating element is activated by the start switch upon contact of the start switch with an object. The method also comprises the step of maintaining the device in the testing position until the heat detector is activated. The method further comprises the step of moving the housing away from the heat detector once the heat detector is activated to change the state of the test switch, whereby changing the state of the test switch freezes the value shown on the display.

DETAILED DESCRIPTION OF THE PREFERRED EMBODIMENTS

Figure 1:
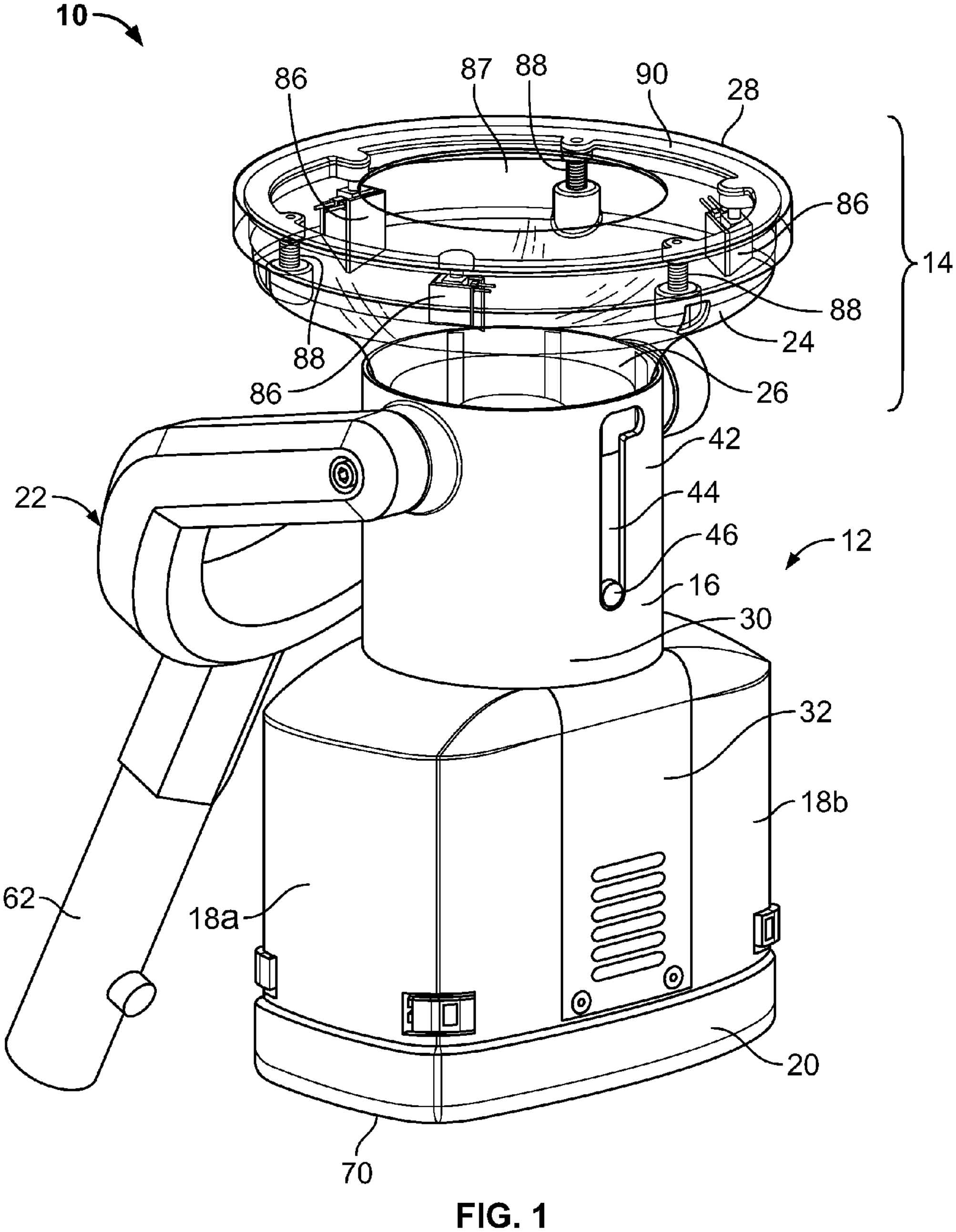
FIG. 1 is an isometric view of a device for testing a heat detector.

Turning now to the drawings, a device 10 for testing a heat detector is shown in FIG. 1. The device 10 includes a housing 12, which is comprised of a testing chamber 14, a body 16, battery compartments 18*a* and 18*b*, and a base 20. Also shown in FIG. 1 is a handle 22, which is connected to the body 16.

Figure 3:
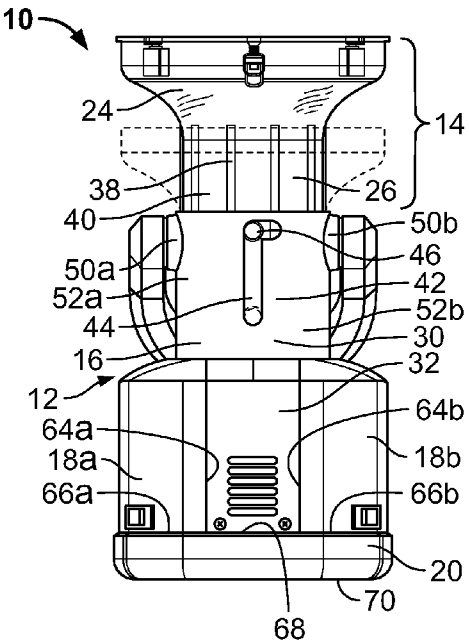
FIG. 3 is a front view of the device of FIG. 1, with the device in an extended position.

As shown in FIG. 1 and FIG. 3, the testing chamber 14 comprises a cup 24, which is frusto-conical in shape, and a cylindrical neck 26. The testing chamber 14 is attached to the body 16 via the neck 26. The cup 24 and the neck 26 guide the device 10 over the heat detector being tested to an optimal testing position, in which the testing chamber 14 surrounds the heat detector creating a close-fit between the heat detector being tested and the testing chamber 14. In a preferred embodiment, the cup 24 and the neck 26 can be made of a durable, transparent material to enable a user to observe the heat detector during testing and see any visual alarms associated with the heat detector. Optionally, the cup 24 and the neck 26 can be made from a durable, non-transparent material. The testing chamber 14 also includes a removable lid 28, which is attached to the upper edge of the cup 24, distal to the neck 26. The lid 28 is placed on the device 10 when heat detectors of a smaller diameter are to be tested. When heat detectors having a larger diameter are to be tested, the lid 28 can be removed. It is preferred that the lid 28 is made of a flexible, heat resistant, non-conductive material such as silicone rubber or Santoprene® so that a firm seal can be created around the heat detector without the user having to exert a lot of pressure to the device 10. A firm seal is important to prevent the loss of heat generated by the device 10 during testing.

The body 16 of the device 10 comprises an upper section 30 and a lower section 32. The upper section 30 is generally cylindrical in shape and the lower section 32 is generally rectangular in shape although any shape can be used so long as the body 16 and the neck 26 have similar shapes. The body 16 is hollow and suitably sized to carry the neck 26 of the testing chamber 14, as well as a heating element 34 and a fan 36 (shown in FIG. 6), both of which will be discussed in more detail below. The body 16 is preferably constructed from a durable, light-weight, heat resistant, and non-conductive material such as nylon, polypropylene, or acrylonitrile butadiene styrene.

The upper section 30 has an inner surface (not shown). Protrusions 38 provided on the neck 26 create a friction fit with the inner surface of the upper section 30. The friction fit of the protrusions 38 and the inner surface of the upper section 30 is such that the testing chamber 14 is able to slide from a compact position as shown in FIG. 1 to an extended position as shown in FIG. 3 and vice versa. In addition, between each of the protrusions 38 are channels 40. The channels 40 enable room-temperature air and excess heat to escape the device 10 during use. Furthermore, a stopping mechanism (not shown) may be provided such as a ledge on the inner side of the upper section 30 and an annular protrusion (not shown) on the bottom of the neck 26 to prevent the neck 26 from being removed from the body 16. An adjustable height of the testing chamber 14 is desirable in order to allow for the testing of both traditional and pencil style heat detectors. The upper section 30 also includes a front side 42, which contains an elongated aperture 44. An adjuster slide 46, which is carried by the neck 26, fits within the elongated aperture 44. The adjustor slide 46 enables a user to select between the compact or extended positions, by moving the adjustor slide 46 along the elongated aperture 44. It is preferable that the adjustor slide 46 contain a mechanical clicking mechanism that enables the neck 26 to be held in place at various points along the elongated aperture 44 to accommodated heat detectors of varying heights. Although a manual adjustor slide is discussed an electronic switch is also contemplated.

In one embodiment as best shown in FIG. 3, the elongated aperture 44 has an upside-down L-shape. In this embodiment, the adjuster slide 46 is moved vertically up the elongated aperture 44 and then pushed to the side to lock the neck 26 in the extended position. Optionally, a second elongated aperture 44*a* and a second adjuster slide 46*a* also may be included on a back side 48 of the neck 26 as shown in FIG. 4, to provide added stability and support to the testing chamber 14 when in the extended position.

The upper section 30 further includes ears 50*a* and 50*b*. The ears 50*a*, 50*b* are located on corresponding left and right sides 52*a* and 52*b*, respectively, of the upper section 30. The handle 22 is attached to the ears 50*a*, 50*b* with pins 54*a* and 54*b* (shown in FIG. 6) and extends behind the back side 48 of the upper section 30. The pins 54*a*, 54*b* can be held in place by any suitable mechanical connection mechanism known to those skilled in the art. The housing 12 is movable about a horizontal axis that extends through the midpoints of the ears 50*a* and 50*b*, thus enabling the housing 12 to be positioned in numerous locations relative to the handle 22.

Figure 2:
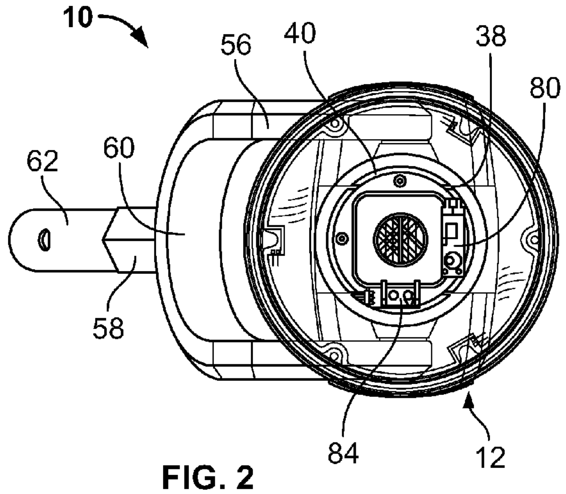
FIG. 2 is a top view of the device of FIG. 1.
Figure 5:
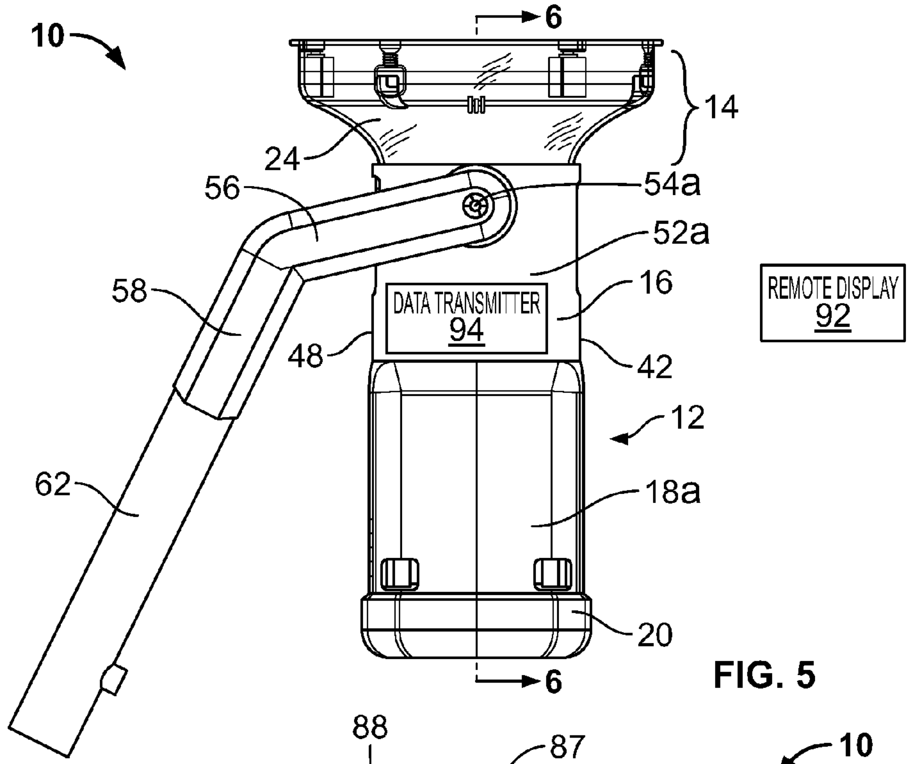
FIG. 5 is a left side elevational view of the device of FIG. 1; the right side being essentially a mirror image thereof.

As best seen in FIG. 2 and FIG. 5, the handle 22 comprises a U-shaped portion 56 and a connection tail 58. The connection tail 58 is attached to the U-shaped portion 56 at a midpoint 60. In one embodiment, the lower part of the U-shaped portion 56 and the connection tail 58 may be positioned at a downward angle of approximately 135 degrees from the upper part of the U-shaped portion 56. The angle and shape of the handle, however, may vary or contain a hinge. In addition, it is preferred that the U-shaped portion 56 be large enough to allow the housing 12 to pass through it as the housing 12 is rotated relative to the handle 22 to enable the testing of heat detectors positioned horizontally, vertically, or at an angle. Furthermore, it is also preferable that the housing 12 be able to lock at a specific position relative to the handle 22. This can be accomplished by including a locking mechanism, ratchet mechanism, or rotary damper. An extension device 62 may be attached to the handle 22 through the connection tail 58 to enable a user to test heat detectors that are in a remote location, e.g., out of reach of the user. The extension device 62 is ideally made out of a lightweight, non-conductive material such as fiberglass and adjustable to enable a user to test heat detectors at varying heights from the floor.

Figure 4:
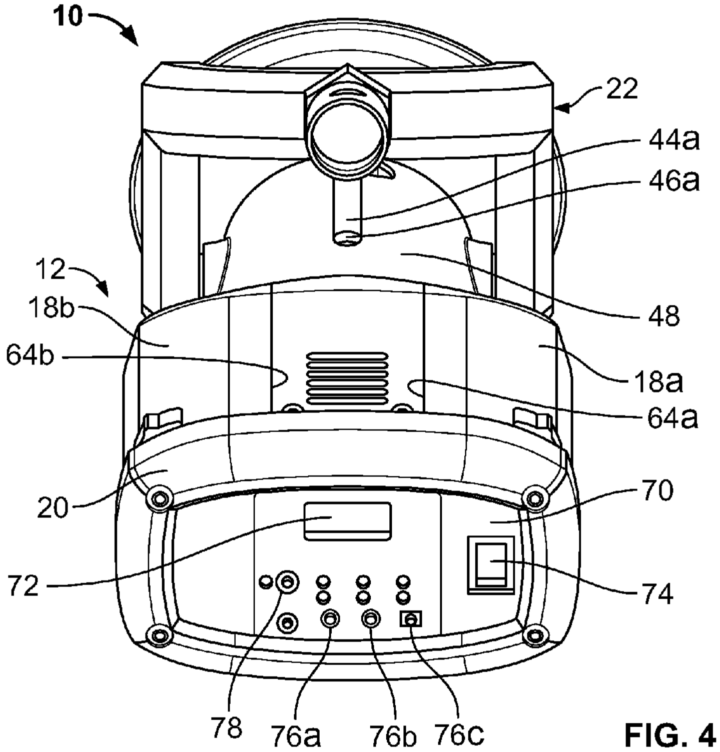
FIG. 4 is a bottom and back slanted view of the device of FIG. 1.

Turning to FIG. 3 and FIG. 4, the lower section 32 comprises left and right portions 64*a* and 64*b*, respectively. Attached to the left and right portions 64*a*, 64*b* are the battery compartments 18*a* and 18*b*, which house standard sized batteries. The battery compartment 18*a* is attached to the left portion 64*a* and the battery compartment 18*b* is attached to the right portion 64*b*. The battery compartments 18*a*, 18*b* also comprise battery base portions 66*a* and 66*b*, respectfully. By including the power source (i.e., batteries) for the device 10 within the housing 12 provides for more efficient testing of heat detectors. First, it eliminates the need for a power outlet and the use of electrical wires or cables that are heavy and burdensome. Second, it enables the device 10 to be quickly mounted on different extension devices for the testing of heat detectors at varying heights and locations. Furthermore, although two battery compartments are provided, the device 10 only requires one battery to operate. The use of a single battery reduces the weight of the device 10, thereby further improving the efficiency of testing high mounted detectors.

Attached to the battery base portions 66*a*, 66*b*, and an underside portion 68 of the body 16 is the base 20. In one embodiment, the base 20 has a generally recta-cylindrical shape and is constructed from material similar to or the same as that used for the body 16. On a bottom 70 of the base 20 are a display 72, power switch 74, mode switches 76*a*, 76*b*, 76*c*, and a test start button 78. The display 72 includes one or more light emitting diodes or LEDs, which are connected by any suitable electronics known by those skilled in the art. LEDs that correspond with the mode switches 76*a*, 76*b*, 76*c* may also be included to provide the user with a visual indication as to which mode they have selected. The display 72 provides the user with the measurement of the temperature taken by a temperature device 80 (shown in FIG. 2), which is preferably housed within the body 16. The temperature device 80 can be an infrared thermometer, thermocouple, or other suitable temperature measuring device. The ability to display the temperature measurement while testing is critical in determining whether the heat detector is operating properly. In addition, the location of the display 72 on the bottom 70 of the base 20 enables the user to observe the temperature measurements displayed during testing. The display 72 may also provide the user with additional information including battery life, type of test being performed, e.g., rate to rise/fixed temperature or high/low temperature test, the date, and time.

The power switch 74 turns the device 10 on and off. When the power switch 74 is activated, power is provided to the display 72, the mode switches 76*a*, 76*b*, 76*c*, the test start button 78, the temperature device 80, and the various LEDs and electronics contained within the device. The test start button 78 is pressed by a user before a test is conducted to clear the information from a previous test shown on the display and/or stored in a memory 82, which is discussed in more detail below. In addition, the test start button 78 is connected to the heating element 34 and the fan 36 via a control board 83 (shown in FIG. 6) and, upon actuation of the test start button 78, power is provided to the heating element 34, the fan 36, and a start switch 86 (shown in FIGS. 1 and 6).

The mode switches 76*a*, 76*b*, 76*c* enables the user to select a testing mode of the device 10. Mode switch 76*a* allows a user to choose between a fixed temperature test mode and a rate of temperature rise test mode. Mode switch 76*b* enables a user to select whether the test is to be performed at a high or low temperature, and mode switch 76*c* enables a user to choose the desired temperature unit, i.e., Fahrenheit (F) or Celsius (C), at which the test is to be performed and displayed. The ability to selectively choose between a fixed temperature and rate of temperature rise test is advantageous because it eliminates the need for multiple heat detector testing devices. Rather than having to switch between two different devices, a user can use one device, device 10, to test two different types of heat detectors or to test two different functions within one heat detector, thereby saving time and money. In addition, the ability to select a high or low temperature test is desirable because it enables two different categories of heat detector to be tested—one category grouped around 135 degrees F. and one category grouped around 200 degrees F. Although multiple mode switches are discussed, a single multi-mode switch can be used. Furthermore, in lieu of separate mode and power switches, the device 10 may contain a single, combined power/mode switch.

When a fixed temperature test is selected by the user, the control board 83 is programmed to monitor the temperature of the air around the heat detector and adjust power to the heating element 34 and the fan 36 to maintain a desired or maximum temperature for a period of time. For example, if a low temperature test is selected, the control board 83 will regulate the heating element 34 and the fan 36 such that when a maximum temperature of 150 degrees F. is reached, that temperature is maintained for approximately 20 seconds. Similarly, if a high temperature test is selected, the control board 83 will adjust the power to the heating element 34 and the fan 36 so that once a maximum temperature of 200 degrees F. is reached, it is maintained for several seconds. The ability to reach and maintain a maximum temperature is beneficial and an important improvement because some heat detectors do not actuate immediately, i.e., as soon as the air around the detector is heated to a specific temperature. Rather, some heat detectors require the heating of the entire heat detector itself before actuation will occur, which requires more time and exposure to the heated air. If the temperature is not monitored and the heating element 34 and the fan 36 are not regulated, the temperature of the heated air produced by the heating element and directed by the fan will continue to rise, which may cause internal and/or external portions of the heat detector to melt or become damaged in some way. Therefore, by programming the control board 83 to regulate the heating element 34 and the fan 36 such that a specific temperature is reached and maintained, damage to the internal and external portions of the heat detector can be prevented.

Figure 6:
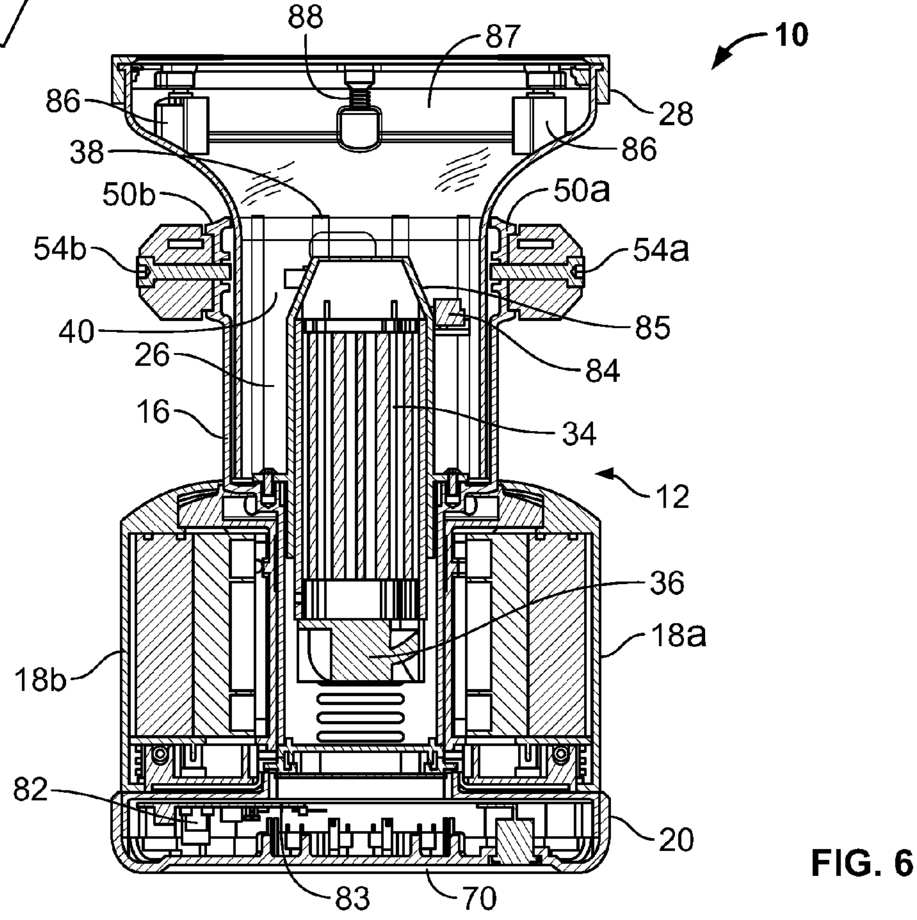
FIG. 6 is a cross-sectional view of the device along the lines 6-6 of FIG. 5.

FIG. 6 is a cross-sectional view of the device 10 taken along the line 6-6. Housed within the upper and lower sections 30, 32 of the body 16 are the heating element 34, the fan 36, and a nozzle 85. The heating element 34 may be a positive thermal coefficient (PCT) ceramic heating element, an open coil heater, or similar heating device. In one embodiment, a PCT heating element is used such as a Cirrus 40/2 Fan Heater manufactured by DBK David+Baader GmbH.

The fan 36 is disposed on one side of the heating element 34 and the nozzle 85 is located on a different side. For example, as shown in FIG. 6, the fan 36 may be located below the heating element 34 and the nozzle 85 may be located above the heating element 34. When activated, the fan 36 blows air through the heating element 34, which heats the air, and the nozzle 85 further directs the heated air at the heat detector being tested. The use of the fan 36 is important because it provides for efficient testing of the heat detector by blowing the heated air directly at the heat detector.

The start switch 86 may be disposed on an inner rim 87 of cup 24 as shown in FIGS. 1 and 6, or attached to the exterior of the housing 12. The start switch 86 may be a mechanical switch that is activated manually by the user by placing the device against a heat detector or surface such that the heat detector or surface changes the state of the start switch 86 by contact. The start switch 86 may also be a photoelectric eye or force sensing resistor. A photoelectric eye is activated upon a change in ambient light. A force sensing resistor is a device that exhibits a decrease in resistance with an increase in the force applied to an active surface, and acts as a switch when a threshold or "break force" is applied to the active surface.

In the preferred embodiment, the start switch 86 is a mechanical switch that requires physical contact to be activated. It is preferable that more than one start switch 86 be provided to ensure that activation occurs without the need for great accuracy when placing the device 10 up to the heat detector. In addition, springs 88 and an annular plate 90 (as best shown in FIG. 1) are also provided to assist in the activation of the start switch 86. The springs 88 bias the annular plate such that the annular plate 90 remains in contact with the start switches 86 but does not trigger them. When pressure is applied to the annular plate 90, the springs 88 depress and at least one start switch 86 is activated. Therefore, when the device 10 is held up to the heat detector, the start switch 86 is activated when it comes into physical contact via the annular plate 90 with the heat detector or a surface such as a ceiling or wall. Activation of start switch 86, turns on the heating element 34 and fan 36 thereby commencing a test cycle. The heating element 34 generates heated air, which is directed by the fan 36 and nozzle 85 to the heat detector.

In order to protect against an inadvertent continuation of the test cycle, a test switch 84 is provided to determine if the test cycle should be continued. The test switch 84 may be located within the body 16 as shown in FIG. 6 and is connected to the heating element 34, the fan 36, and the power switch 74 via the control board 83. In a preferred embodiment, the test switch 84 is an optical proximity switch, which senses the presence of the heat detector using a light transmitter and a receiver. Alternatively, the test switch 84 may be a sonar proximity switch, which sends and receives sound waves to detect the presence of the heat detector. In a further embodiment, the test switch 84 may be a solid state chargecoupled device (CCD) light sensing device with appropriate electronics to detect or identify an object at the opening of the test chamber 14.

The test switch 84 determines if a heat detector is located within the testing chamber 14 of the device 10 approximately five seconds after the start switch 86 is actuated. If the test switch 84 confirms the presence of a heat detector, then the test switch 84 remains in a first state and the test cycle is continued. If a heat detector is not present, then the test switch 84 enters a second state. In the second state, the test switch 84 does not detect the physical presence of the heat detector and turns off the heating element 34 and the fan 36 thereby ending the test cycle. In one embodiment, a sound or light indicator (not shown) is included in the device 10 to inform the user that the test cycle has ended.

If the test switch 84 confirms the presence of a heat detector, the heating element 34 and fan 36 remain activated. The user maintains the device 10 in a testing position until the heat detector is activated. Once the heat detector is activated (i.e., an alarm is observed), the user moves the device 10 away from the heat detector. Moving the device 10 away from the heat detector causes the test switch 84 to enter the second state. When this occurs, the testing cycle is concluded, i.e., the heating element 34 and fan 36 are deactivated, and the temperature shown on the display 72 is frozen. Freezing the display 72 then enables the user to observe and record the temperature at which the heat detector was activated.

Alternatively, when the second state occurs, the temperature at which the heat detector is activated is recorded and stored in the memory 82 contained within the device 10 as shown in FIG. 6. This may occur with or without a simultaneous freezing of the display 72. The memory 82 may be a computer chip or other similar device for recording and storing the temperature reading at which the heat detector was activated and other pertinent information. As shown in FIG. 5, the recorded and stored data can then be transmitted to a remote display 92 for further analysis through the use of a data transmitter 94. The data transmitter 94 can be a wireless device such as Bluetooth, a removable drive, a wireless network, an optical data transmission device, or a standard computer connection such as a USB. The remote display 92 may be a LED display board, computer monitor, television monitor, or similar device. The remote display 92 may be attached to a computer, to the end of the extension device 62, or to a handheld device carried by the user.

To test a heat detector that is located in a remote location with the device 10, a user attaches the device 10 to the extension device 62 via the handle 22. The user turns on the device 10 with the power switch 74 and uses the mode switches 76*a*, 76*b*, 76*c* to select the appropriate testing modes. With the mode switches, the user selects the type of heat detector to be tested, i.e., rate of rise or fixed temperature, the temperature unit to be used and displayed, and whether a high temperature or low temperature test is to be conducted. The user may also adjust the height of the testing chamber 14 using the adjuster slide 46 depending on the size of the heat detector to be tested. After the appropriate height of the testing chamber and testing modes are selected, the user presses the start test button 78, raises the device 10 to the heat detector being tested. The start switch 86 is activated when it comes into physical contact via the annular plate 90 with the heat detector or a surface upon which the heat detector is mounted. The heat detector is then moved closer to the heat detector until a testing position is reached. In the testing position, the testing chamber 14 surrounds and lies in close proximity to the heat detector and the lid 28 is pressed against the surface on which the heat detector is located.

When the start switch 86 is activated, it turns on the heating element 34 and the fan 36. After five seconds the test switch 84 determines if a heat detector is present. If a heat detector is present, then the test switch 84 continues the test. The user maintains the device 10 in the testing position until the heat detector is activated. Once the heat detector is activated, the user moves the device 10 away from the heat detector; moving the device 10 away from the heat detector causes the test switch 84 to turn off the heating element 34 and the fan 36 and at the same time freeze the temperature shown on the display 72 and/or stores the temperature in the memory 82. The user then lowers the device 10 and may record the temperature measurement shown on the display 72.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A device for testing a heat detector, comprising:
- a housing shaped to receive a heat detector;
- a heating element carried by the housing;
- a fan located proximate to the heating element and adapted to activate the heat detector by increasing a temperature around the heat detector;
- a temperature device carried by the housing that measures the temperature around the heat detector;
- a display attached to the housing that shows a value that relates to the temperature; and
- a start switch carried by the housing, wherein activation of the start switch turns on the heating element and fan.

2. The device of claim 1, further including a test switch carried by the housing, wherein a change of state of the test switch causes the value shown on the display to be stored in a memory.

3. The device of claim 2, wherein the change of state of the test switch freezes the value shown on the display.

4. The device of claim 1, wherein the temperature device is at least one of an infrared thermometer and a thermocouple.

5. The device of claim 1, further comprising an attachment mechanism connected to the housing for removable mounting of an extension device.

6. The device of claim 1, further comprising a switch that provides power to the device and enables a user to select a mode of testing.

7. The device of claim 6, wherein the mode of testing is at least one of a rate of temperature rise test mode and a fixed temperature test mode.

8. The device of claim 6, wherein the mode of testing is at least one of a high temperature test mode and a low temperature test mode.

9. The device of claim 1, wherein the heating element is at least one of an open coil heater and a positive thermal coefficient ceramic heating element.

10. The device of claim 1, wherein the housing is adjustable between a compact position and an extended position.

11. The device of claim 1, wherein the housing is adapted to receive at least one battery.

12. The device of claim 2, wherein the test switch is at least one of an optical proximity switch, a sonar proximity switch, and a CCD light sensing device.

13. The device of claim 1, further comprising a control board, wherein the control board regulates the heating element and the fan such that when a maximum temperature is reached the maximum temperature is maintained for a period of time.

14. A device for testing a heat detector, comprising:

a housing shaped to receive a heat detector;

a heating element carried by the housing and adapted to activate the heat detector by increasing a temperature around the heat detector;

a temperature device carried by the housing that measures the temperature near the heat detector;

a memory carried by the housing for storing a value related to the temperature; and a test switch carried by the housing;

wherein a change of state of the test switch causes the value to be stored in the memory.

15. The device of claim 14, wherein the memory is a computer memory chip.

16. The device of claim 14, further comprising means for transmitting the value to a remote display.

17. The device of claim 16, wherein the remote display is located at the end of an extension device.

18. The device of claim 16, wherein the remote display is a monitor.

19. The device of claim 16, wherein the means for transmitting the value is at least one of a USB and Bluetooth device.

20. A method of testing a heat detector with a device, the device comprising a housing shaped to receive a heat detector; a heating element carried by the housing and adapted to activate the heat detector by increasing a temperature around the heat detector, a temperature device carried by the housing that measures the temperature near the heat detector, a display attached to the housing that shows a value that relates to the temperature, a start switch carried by the housing, and a test switch carried by the housing, wherein a change of state of the test switch freezes the value shown on the display, the method comprising the steps:

moving the device toward the heat detector to be tested until a testing position is reached, wherein the housing of the device substantially surrounds the heat detector in the testing position and wherein the heating element is activated by the start switch upon contact of the start switch with an object;

maintaining the device in the testing position until the heat detector is activated; and moving the housing away from the heat detector once the heat detector is activated to change the state of the test switch, whereby changing the state of the test switch freezes the value shown on the display.

21. The method of claim 20, the method further comprising the step of activating a switch.

22. The method of claim 21, the method further comprising the step of using the switch to select between a rate of rise heat detector test mode or a fixed temperature heat detector test mode.

23. The method of claim 21, the method further comprising the step of using the switch to select between a high temperature test mode and a low temperature test mode.

24. The method of claim 20, the method further comprising the step of adjusting the height of the housing by selecting between a compact position and an extended position of the housing.

25. The method of claim 20, the method further comprising the step of removably mounting the device on an extension device using an attachment mechanism that is connected to the housing.

26. The method of claim 20, the method further comprising the step of recording the value relating to the temperature shown on the display.

27. The method of claim 26, the method further comprising the step of storing the value relating to the temperature shown on the display.

28. The method of claim 20, the method further comprising the step of activating the test switch after a predetermined time, wherein the heating element remains turned on if the test switch detects the presence of the heat detector.

* * * * *